June 25, 1957 W. A. YATES ET AL 2,796,756
VIBRATION CALIBRATOR
Filed Sept. 30, 1954 4 Sheets-Sheet 1

INVENTORS
WILFRED A. YATES
MARTIN DAVIDSON
BY
*B. L. Dangerill*
ATTORNEYS

INVENTORS
WILFRED A. YATES
BY MARTIN DAVIDSON

B. L. Zangwill
ATTORNEYS

INVENTORS
WILFRED A YATES
MARTIN DAVIDSON
BY
B. L. Zangwill
ATTORNEYS

June 25, 1957

W. A. YATES ET AL 2,796,756

VIBRATION CALIBRATOR

Filed Sept. 30, 1954

INVENTORS
WILFRED A. YATES
MARTIN DAVIDSON
BY

*B. L. Zangwill*

ATTORNEYS

United States Patent Office 2,796,756
Patented June 25, 1957

2,796,756

VIBRATION CALIBRATOR

Wilfrid A. Yates, Silver Spring, and Martin Davidson, Bethesda, Md., assignors to the United States of America as represented by the Secretary of the Navy Application September 30, 1954, Serial No. 459,562

5 Claims. (Cl. 73—1)

(Granted under Title 35, U. S. Code (1952), sec. 266)

The invention described herein may be manufactured and used by or for the Government of the United States of America for governmental purposes without the payment of any royalties thereon or therefor.

The present invention relates to a wide range calibrator for vibration measuring apparatus and more particularly to a novel vibration calibrator for accurately measuring and indicating the peak vibration amplitude of a vibration generator or standard.

The importance of determining the vibration characteristics of various elements of systems in use today is universally recognized. Hence, a number of vibration measuring arrangements have been devised for measuring and indicating the frequency, amplitude and other vibration characteristics of such vibrating elements or systems. Since each measuring arrangement employs a vibration pickup or transducer of one type or another to translate the mechanical motion into electrical or other suitable media, it is customary to calibrate the pick-ups with a vibration standard. In the past, the calibration of these vibration standards created no problem since vibration measurements were made infrequently and were generally limited to rough approximations. However, with the ever-increasing and wider applications of vibration measurements, a serious calibration problem is introduced and the need for a rapid, reliable calibration of a vibration standard over wide ranges of amplitude and frequency is emphasized. This is especially so in instances where the higher frequency components of vibration must be determined and where resonant properties of the pick-up may complicate analysis.

Accordingly, it is one of the prime objects of the present invention to provide a vibration calibrator for a mechanical vibration standard which is capable of rapid, reliable calibrations of the vibration standard over wide ranges of amplitude and frequency.

Another object of the present invention is to provide a vibration calibrator which provides an extremely accurate indication of the peak vibration amplitude of a vibrating body.

A further object of the invention is the provision of a vibration calibrator which provides a direct meter indication of vibration amplitude over a wide range of frequencies.

A still further object of the invention is the provision of a calibrating instrument employing a mutual-inductance transducer to obtain precise vibration measurements.

Another object of the present invention is the use of the invariance of the pick-up transfer characteristic under static and dynamic conditions to standardize the instrument for high frequency vibration measurements by means of a static displacement.

Another object of the present invention is the provision of a vibration calibrator employing a pick-up which is non-sensitive to the dielectric contstant of an intervening medium.

Yet another object of the invention is the provision of a vibration calibrator which is easily adaptable for use with various types of vibration generators and which may itself be standardized by a comparison involving a displacement which is easily obtainable in a laboratory.

Still a further object of the present invention is the provision of a relatively simple apparatus which is exceedingly stable and accurate for performing its intended duties.

Other objects and many of the attendant advantages of this invention will be readily appreciated as the same becomes better understood by reference to the following detailed description when considered in connection with the accompanying drawings wherein.

Figure 1:
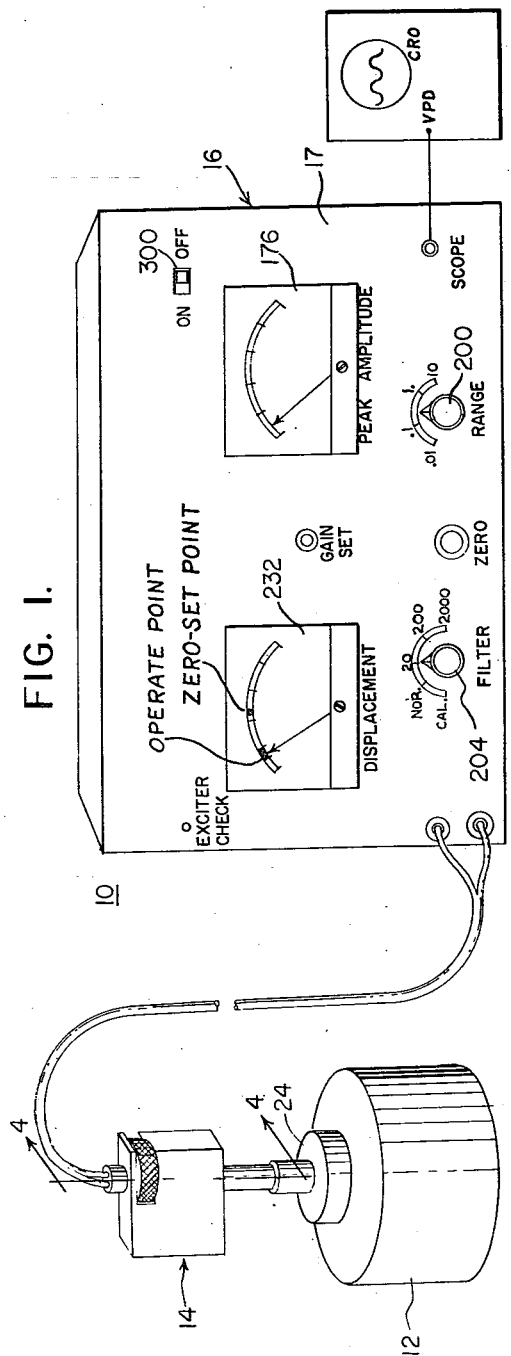
Figure 1 is a perspective view of a vibration calibrator constructed in accordance with the teachings of the present invention and positioned in operative relation with a conventional vibration generator which is to be calibrated.

Referring now to the drawings wherein like reference characters designate like or corresponding parts throughout the several views, there is shown in Figure 1 a perspective view of a vibration calibrator 10 embodying the preferred features of the instant invention, and a vibration generator 12 which is to be calibrated. The vibration calibrator, which is basically adapted for use as a laboratory instrument, primarily comprises two basic components. These components include a vibration pick-up unit or transducer 14 of the non-contacting displacement-type and a main unit 16 comprising the electrical and electronic circuits thereof. Generally, vibration calibrator 10 operates to accurately measure the vibration amplitude and the operating frequency or range of frequencies of the vibration generator 12. Upon accurately determining the vibration characteristics of the vibration generator over its entire operating range, the generator is used as a laboratory or manufacturing standard to directly calibrate the unknown measuring characteristics of various transducers or vibration pick-ups. That is, the vibration meter reading of the vibration calibrator is compared with the electrical output of a transducer mounted on the vibration generator. After being calibrated the transducer may be used elsewhere to make vibration measurements. Preferably, the electrical components of the vibration calibrator 10 are enclosed in a housing 17 having a plurality of indicating instruments and control means for determining and controlling the operation thereof. These instruments and controls will hereinafter be more particularly described and identified when reference is made to the specific circuit arrangement of the vibrator generator.

Figure 2:
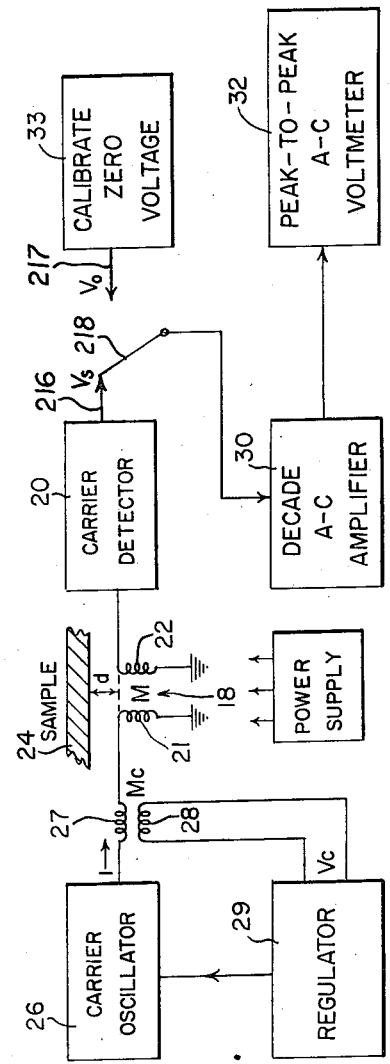
Figure 2 is a block diagram view of the various components comprising the preferred embodiment of the invention shown in Figure 1.

Referring specifically to Fig. 2, there is shown a complete block diagram of the various electrical components comprising the vibration generator 10. This generator includes the mutual inductance transducer 14 comprising a carrier excited air-core transformer 18 and a carrier detector 20. Since the coupling M between the primary and secondary windings 21 and 22, respectively, of transformer 18 varies with the distance $d$ between the plane of the windings and the vibrating surface 24 of the vibration generator 12 under calibration, transformer 18 comprises a variable mutual inductance unit.

The carrier oscillator 26 serves as a source of excitation for the primary winding 21 of the pick-up and thus acts to generate an alternating current at a predetermined frequency. Preferably, the output frequency of the oscillator is in the order of several megacycles such as, for example, 2.3 megacycles. This current is fed through the primary winding 18 of transformer 18 for excitation of the pick-up 14 and to the primary winding 27 of a fixed mutual inductance transformer 28 of a regulator circuit 29. As will hereinafter become apparent, the voltage output $V_c$ of the transformer 28 is proportional to the product of the current and frequency in its primary winding. This voltage is used to regulate the output current and frequency of the carrier oscillator through the regulator circuit 29 in that the regulator circuit serves to provide a correcting feedback signal to oscillator 26 which is proportional to an error signal from the oscillator.

It will be apparent that as surface 24 is rapidly vibrated, the radio frequency output of the pick-up secondary 22 will be modulated at the frequency of vibration and because the excitation of the primary winding is held constant by regulation, the output of the secondary 22 will be a function of the separation $d$ only. This output is fed to the carrier detector 20 wherein the modulated radio frequency signal is detected for producing a D. C. voltage having an A. C. component superimposed thereon. To obtain an indication of the amplitude of vibration, the detected A. C. component is amplified by a decade A. C. amplifier 30 and then applied to a peak-to-peak A. C. voltmeter 32. The response of the indicating instrument is peak-to-peak, although for convenience the meter scale in the circuit of the A. C. voltmeter is calibrated in terms of peak values to provide a direct amplitude indication. This calibration arises from the standardization of the instrument when the vibration generator is quiescent and is accomplished by means of a chopper operating in its A. C. excited mode i. e. the moving contact 218 of the chopper being rapidly switched back and forth between the stationary contacts at, for example, 60 cycles per second, and by means of a calibrate-zero circuit 33. In this circuit, a voltage $V_o$ is developed with which the carrier detector D.-C. output voltage $V_s$, which is present whenever the pick-up 14 is in its zero-set position, is compared by means of the chopper. The calibrate zero circuit is adjusted so that $V_o$ is equal to $V_s$ and hence these voltages "buck out" when the pick-up is at the zero set position. Then as will be more specifically described, by adjusting the pick-up toward surface 24 a precisely measured standardizing distance from the zero-set position and adjusting the A. C. voltmeter and other circuits, a direct comparison may then be made between the amplitude of surface vibration and an actual static displacement of the transducer or pick-up 14.

Figure 3A:
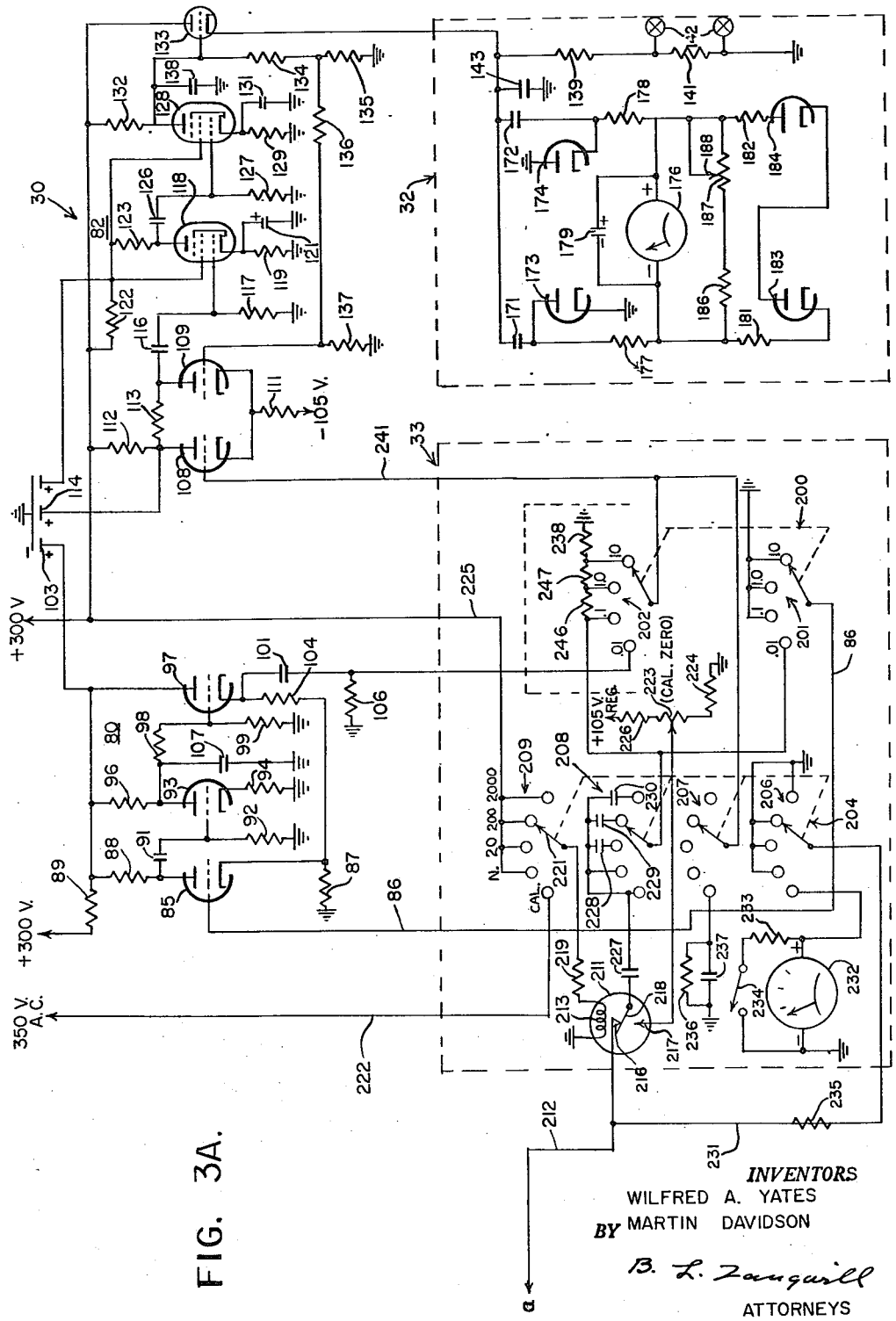
Figures 3a and 3b are schematic diagrams which when joined together at a show a complete circuit diagram comprising the preferred embodiment of the invention.
Figure 3B:
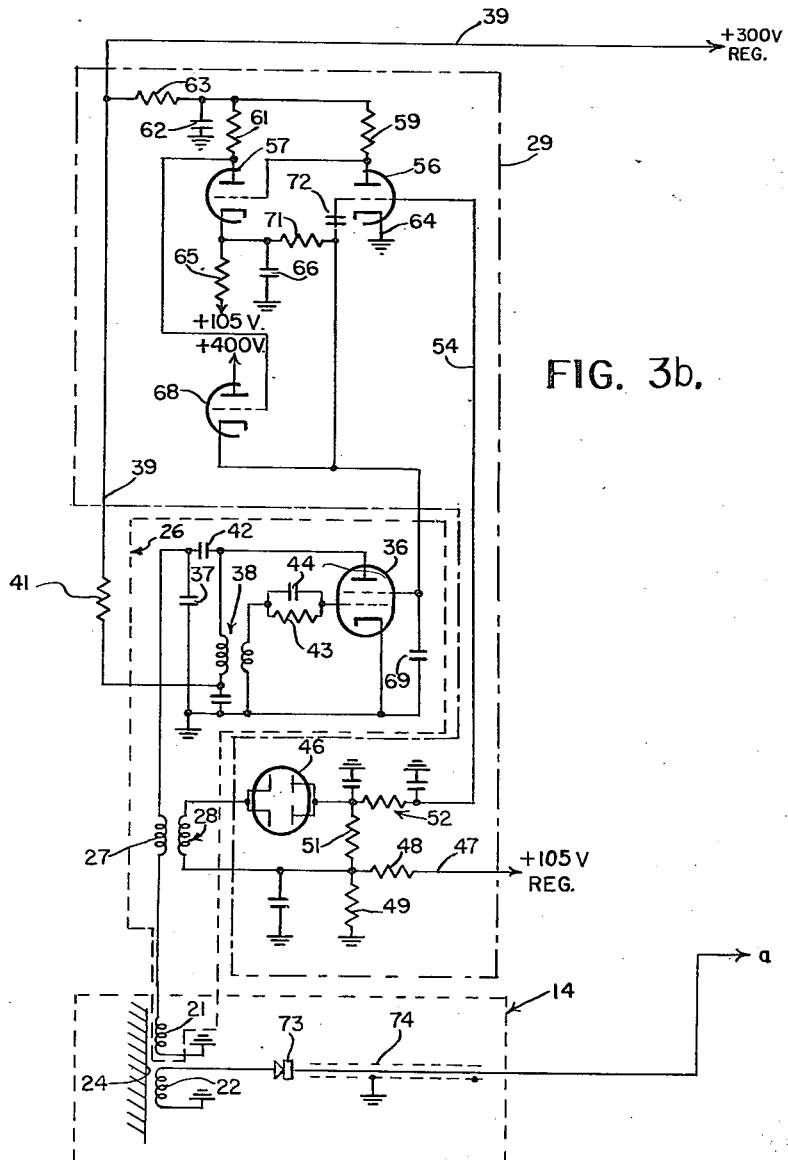

The specific circuit arrangement of the vibration calibrator is shown in Figs. 3a and 3b; the two figures being joined together at the terminals $a$—$a$ to form a unitary unit. For convenience in the description of the circuit below, the circuit is divided into individual functional components and each will be separately described. For purposes of clarity, the individual components are also separated in the drawings by a series of dotted line sections. It is to be understood, however, that these units mutually coact with each other to form an integral system for performing the functions of the vibration calibrator.

*Carrier oscillator*

The carrier oscillator 26 functions to provide an excitation current to the primary winding of probe 14 and comprises an electronic tube 36, preferably of the tetrode type. The oscillator further includes a tank circuit coupled to the plate element of tube 36 comprising the primary winding 27 of transformer 28 and the primary winding 21 of pick-up transformer 18. The two windings are series connected to ground on one end and to the plate element of tube 36 on the other end. A conventional tank capacitor 37 is connected in parallel therewith. Plate-to-grid feedback for sustaining oscillation in the circuit is obtained through a plate transformer 38 which has its primary winding connected to a regulated B+ potential by way of line 39 and resistor 41. The other terminal of the primary winding of transformer 38 is connected to the plate element of tube 36 and to the tank circuit through a coupling capacitor 42. The secondary of transformer 38 has one terminal connected to ground and its other terminal connected to the control grid element of tetrode 36 through a grid leak resistor 43 which is connected in parallel with a by-pass capacitor 44. The cathode element of tube 36 is directly connected to ground. In a known manner, oscillator 22 will generate in its tank circuit a current having a frequency which is determined by the particular values of inductances 21 and 27 and capacitor 37. This frequency is preferably fixed at several megacycles such as for example, 2.3 megacycles.

*Regulator*

The circulating current and oscillating frequency of the oscillator tank circuit is closely regulated by regulator 29. This circuit performs its regulating functions by including the carrier oscillator in a feedback loop whose gain is controlled by an error signal from the oscillator. For this purpose, fixed mutual inductance transformer 28 is coupled to the tank circuit of the oscillator. This transformer which has its primary winding 27 in the tank circuit of the oscillator, develops a signal potential $V_c$ in its secondary winding which is proportional to the current and frequency of the tank circuit. This potential is rectified in a circuit including diode 46 and subtracted from a reference D. C. potential. In so doing, the diode serves as a peak detector.

The reference D. C. potential is obtained through line 47 from a suitable regulated B+ potential source of approximately 105 volts and across a precision divider circuit comprising resistors 48 and 49 of which resistor 48 has one terminal connected to the regulated potential source and resistor 49 has one terminal connected to ground potential. The common terminal of resistors 48 and 49 is connected through resistor 51 to the plate element of diode 46. It will be apparent that by placing a regulated potential upon the plate element of diode 46, conduction of the diode will occur only when an error signal is developed; that is, when a difference of potential exists between the rectified signal and the reference potential. This error signal is then filtered in a resistance-capacitance filter 52. It is noted therefore that the error signal is developed by rectifying the voltage in the diode circuit and subtracting this voltage from the reference D. C. voltage maintained by the precision divider consisting of resistors 48 and 49.

This error signal is fed from the detector circuit through line 54 to a two stage D. C. voltage amplifier including electronic amplifier tubes 56 and 57, both preferably of the triode type. The circuits of these tubes are basically identical and include a pair of load resistors 59 and 61, repectively, which are connected through a voltage dropping resistor 63 to a regulated B+ power supply line 39 and to a R. F. by-pass capacitor 62 to ground. The cathode element of tube 56 is grounded as at 64, while the amplified error signal output of this tube is taken from its plate element and directly fed to the control grid element of amplifier tube 57. The cathode element of amplifier tube 57 is biased positively by a resistor 65 connected thereto and to a positive potential of approximately +105 v. Desirably a by-pass capacitor 66 is connected across resistor 65 and to ground.

The signal output of the amplifier stages is taken from the plate element of tube 57 and fed to the control grid elements of an electronic triode tube 68 of a cathode follower stage. The plate element of tube 68 is directly connected to a B+ supply potential of approximately 400 v.

while the cathode element is connected to the screen grid of oscillator tube 36; the screen grid also being connected to ground through a by-pass capacitor 69. The signal output from the cathode follower stage is thus fed to the screen grid of oscillator tube 36 and as such, acts to control the circulating current and frequency of the oscillator tank circuit.

As will hereinafter become apparent, any variations in the secondary winding of transformer 28, which are indicated as changes in the signal $V_c$, will be indicated by the A. C. voltmeter 32 as a variation in the measured amplitude of vibration. By providing the closely regulated carrier oscillator wherein the product of the circulating current and frequency in the oscillator tank circuit is maintained constant, the excitation of the pick-up 14 is maintained constant within the desired degree of accuracy.

In order to increase the gain of the second stage of D. C. amplification, a resistor 71 is connected between the cathode element of cathode follower tube 68 and the cathode element of amplifier tube 57. The resistor 71 serves to provide a positive feedback signal to increase the amplification of the second stage. Also connected to the cathode element of tube 68 is a capacitor 72. The other terminal of capacitor 72 is connected to the control grid of the first stage amplifier tube 56. The purpose of capacitor 72 is to prevent free oscillation of the regulation loop by restricting the frequency response of the amplifier. By utilizing capacitor 72, a negative feedback is introduced and the loop gain is reduced by one-half at a frequency of 80 cycles per second. It will be noted that the regulation loop improves the signal to noise ratio in the oscillator circuit, which, in the present embodiment, determines the lower limit of vibration amplitude measurement. The noise level in the present embodiment produces an approximate .4 microinch deflection on the voltmeter.

*Pick-up circuit*

The transducer or pick-up 14 is a mutual inductance type of electronic micrometer and generally comprises a R. F. excited, air-core transformer in which the coupling between the stationary primary and secondary windings varies with respect to the distance between the plane of the windings and a metallic surface. As shown in Figure 3b, the electrical circuit of pick-up 14 comprises a pair of mutually inductive windings in which the primary winding 21 is connected in series with a winding 27 and comprises a portion of the oscillator tank circuit. The secondary winding 22 has one end grounded and the other terminal connected to a suitable detector 73 such as, for example, a germanium crystal diode detector. It will be noted that the detector loading of the secondary winding is made small so that a substantially open circuit condition prevails, and, thus, the secondary winding does not materially affect the operation of the oscillator tank circuit. The detector circuit further includes a coaxial cable 74 of relatively low capacitance and a resistor 235 (Fig. 3a) connected in parallel therewith.

Pick-up 14 is sensitive to vibration by virtue of the fact that upon the movement of adjacent metallic surface 24, the inductive coupling between the R. F. energized primary and secondary windings varies. This effects an amplitude modulation of the carrier output of the secondary winding. It is obvious that with a constant current and frequency excitation of winding 21, the open circuit voltage output of the secondary winding will be a function of the distance between the metallic surface and the transducer only. While a variation in the effective inductance of the primary winding, due to the proximity of the metallic surface, will effect the frequency of oscillation by a small amount, the R. F. excitation which is a product of the primary current and frequency, will remain constant. The preferred structural embodiment of the pick-up is disclosed in Figures 4, 5, and 6 and will be described hereinafter. The output from the probe is selectively fed to the calibrate zero voltage circuit 33 and the decade A. C. amplifier on a fifty percent duty cycle time sharing basis or continuously to the decade A. C. amplifier 30 depending upon the particular arrangement or operation being performed at that time. While the calibrate zero voltage circuit will be described hereinafter, it is preferable to first describe the decade A. C. amplifier for purposes of simplicity.

*Decade A. C. amplifier*

The decade A. C. amplifier includes a preamplifier 80 which is used to amplify the signals from the probe when measurements are made by the lowest scale of the instrument and a main amplifier 82 which is used to amplify all signals arising from the transducer or pickup. The preamplifier, which has a gain of very close to 10 comprises two stages of amplification and a cathode follower output stage. The first amplification stage comprises an electronic tube 85 of the triode type. As will become apparent, the signal is fed from the secondary winding 22 of the pick-up 14, through a filter switching arrangement to be later described, and to the control grid element of tube 85 through a lead 86.

The cathode element of tube 85 is grounded through a resistor 87 while the plate element is connected through a loading resistor 88 and a voltage dropping resistor 89 to a regulated B+ potential of approximately +300 v. The output of the first amplification stage is taken from the plate element of tube 85 through a resistance-capacitance coupling circuit comprising capacitor 91 and grid resistor 92 to the control grid element of an electronic tube 93 of the second amplification stage. The cathode element of tube 93 is grounded through biasing resistor 94 while the plate element of tube 93 is connected to B+ potential through a plate loading resistor 96 and the voltage dropping resistor 89. The amplifier signal output of the second amplification stage is then fed to a cathode follower output stage comprising an electronic tube 97 through a resistor network including resistor 98 and resistor 99. The signal output from the cathode follower stage is taken, conventionally, from its cathode element through a circuit including capacitor 101 and resistor 106 and is fed through a selector switch hereinafter to be described to the main amplifier of the A. C. amplifier stage. The plate of follower tube 97 is led directly to B+ through the voltage dropping resistor 89. An electrolytic by-pass condenser 103 is also connected to the plate element and to ground.

Preferably, the gain of preamplifier 80, comprising the stages having tubes 85, 93 and 97, is stabilized by inverse feedback which is obtained by returning a portion of the output signal to the cathode of the input tube. This is provided by a resistor 104 which is connected between the cathode element of tube 97 and the cathode element of tube 85. It will be noted that loop oscillations are avoided in the preamplifier stage by the use of only one capacitive interstage coupling network which, in this instance, comprises capacitor 91 and resistor 92. Desirably, a capacitor 107 is connected between the plate element of tube 93 and ground to reduce the high frequency response of the preamplifier. This is made necessary by the presence of noise components arising in the input stages of the vibration calibration. By reducing the bandwidth of the preamplifier, greater accuracy is obtained in the unit.

The main amplifier of vibration calibrator 10 comprises a three sage A. C. coupled amplifier which is gain stabilized by inverse feedback. The first stage is a dual-triode cathode-coupled amplifier which includes a pair of electronic tubes 108 and 109. The tubes, which may be placed in a single envelope for purposes of convenience, are coupled together at their cathodes and biased through a cathode resistor 111 by a B— power supply which, in this instance, is —105 volts. The plate element of tube 108 is connected directly to a B+ potential through a voltage dropping resistor 112 while the plate element of tube 109 is connected through a load resistor 113 to the B+ potential through resistor 112. An electrolytic capacitor 114 is preferably connected to the plate element of tube 109 and to ground.

The input to the main amplifier stage is taken from a switching circuit as will hereinafter be described and fed to the control grid element of tube 108. After amplification in the circuit of tube 108 in the first amplifier stage, the signal is fed to tube 109 through the cathode of these tubes such that it appears in phase at the plate element of tube 109. The output from the first stage amplifier is then fed to a second stage amplifier through a resistive-capacitive coupling network including capacitor 116 and grid resistor 117 to the control grid element of an electronic tube 118 in the next amplification stage. Tube 118 which may comprise a five element tube has its suppressor grid directly connected to the cathode and is biased by means of a cathode resistor 119. Resistor 119 is by-passed to ground by an electrolytic capacitor 121. The screen grid element of tube 118 is connected through voltage dropping resistor 122 to the B+ potential while the plate element of this tube is connected to the B+ potential through a loading resistor 123 and the resistor 122.

The second stage of amplification, like the first stage, is substantially conventional and operates to develop an amplified signal in its output which is fed to a following or third stage of amplification through a resistive-capacitive coupling comprising capacitor 126 and grid resistor 127. The third stage of the main amplifier is similar to the second stage and includes a pentode type electronic tube 128 having its cathode element directly connected to the suppressor grid and to ground through biasing resistor 129, and by-pass capacitor 131. The plate element of tube 128 is connected through load resistor 132 directly to the B+ potential. The output from the third stage of amplification is taken across load resistor 132 and fed to a cathode follower isolating stage having electronic tube 133.

A feedback signal for the main amplifier circuit is obtained through a resistor network including resistors 134, 135, 136 and 137, such that the signal output from the third amplification stage including tube 128 appears in phase at the control grid element of electronic tube 109. This signal then appears at the plate of tube 109 in opposition to the input signal fed through the cathode to provide inverse feedback to the circuit. It will be noted that the loop gain of the amplifier provides approximately 30 db of inverse feedback. With 30 db of inverse feedback, the amplifier gain is almost equal to the fraction of output signal which is fed back to the preceeding stages. This fraction of feedback is predetermined and fixed by the aforesaid resistor network; the latter being proportioned to reduce the output signal by a factor of 1000 so that the stabilized main amplifier gain is thus made approximately 1000.

In order to avoid loop oscillation at the low frequency of amplifier response, the interstage coupling networks comprising capacitor 116 and resistor 117 and capacitor 126 and resistor 127 are proportioned so that their half-power frequency responses are staggered. Similarly, to avoid high frequency loop oscillation, the plate load resistors of electronic tubes 109, 118 and 128 are chosen in a manner to stagger the half-power frequency responses of the individual stages. To further restrict the high frequency response of electronic tube 128, a capacitor 138 is connected between the plate element of electronic tube 128 and ground.

The cathode follower stage functions as a buffer between the main amplifier 82 and the peak-to-peak voltmeter 32 and thus, serves to prevent the loading of the main amplifier by the voltmeter 32. Moreover, the use of the cathode follower stage provides a convenient terminal arrangement for the connection of an oscilloscope, if desired. For the latter, the cathode load resistor of the follower tube 133 is divided into a pair of resistances 139 and 141. Connected across resistor 141 are terminals 142. These terminals permit the connection of an oscilloscope for observation of the signal waveform without loading the main amplifier. Desirably, the cathode load resistors are paralleled by a capacitor 143 for by-passing any radio frequency content passed through the amplifier 82 to the voltmeter 32.

*Peak-to-peak voltmeter*

The voltmeter circuit 32 is essentially conventional and comprises a pair of capacitors 171 and 172, each of which is shunted by an electronic diode tube 173 and 174, respectively. Diode 173 and its capacitor 171 form a negative peak detector while diode 174 and its capacitor 172 form a positive peak detector so that these tubes will conduct only when their respective peak signals are present. It will be apparent therefore that the magnitude of the diode-to-diode D. C. voltage is proportional to the peak-to-peak value of the incoming A. C. signal. This value is measured by an amplitude vibration meter 176 connected across the diodes through a pair of resistors 177 and 178. Meter 176 which comprises an ammeter, preferably is of a sensitive type so that resistors 177 and 178 may be made sufficiently large to maintain the low frequency response of the detector; the response being determined by the time constant comprising the combination of coupling capacitors 171 and 172 and their associated resistors 177 and 178, respectively. Connected across meter 176 is a capacitor 179 which acts to slow the meter movement or response during operation.

It will be apparent that the current flowing through the loop comprising resistors 177, 178 and meter 176 will be additive. In order to cancel any current flow during the interval when a no-signal state is had by the circuit, a pair of resistors 181 and 182 and a pair of electronic tubes 183 and 184 are connected in shunt relation across meter 176. As a result, the emission current generated by diodes 183 and 184 will flow in opposition to the current flow through the meter. The gain of the output circuit is controlled through the medium of resistors 186 and 187 connected in shunt relation with meter 176. Desirably, resistor 187 is variable as by a tap 188 so that the sensitivity of meter 176 may be adjusted.

*Calibration filter and range circuit*

The calibrate, filter and range circuits are shown in Fig. 3a as comprising the zero calibrate voltage circuit 33. These circuits include a range switch 200 having two banks of contacts 201 and 202, a calibrate filter switch 204 having four banks of contacts 206, 207, 208, and 209, and an electromagnetically driven switch with single pole double through contacts otherwise known as a chopper or vibrator 211, and a displacement meter 232. The calibrate circuit of the instant embodiment serves to convert an incremental change in the pick-up D. C. ouput voltage related to the standardizing distance to an A. C. signal and to adjust the indicated amplitude of meter 176 to read full scale to correspond with a standard displacement of the pick-up producing the incremental change in the D. C. output voltage. As shown in the drawing, the instrument is calibrated by switching filter switch 204 to its "calibrate" position and moving range switch 200 to its 10 mil range. Meanwhile, pick-up 14 is physically positioned at a zero set point which is chosen to be a certain fixed distance, determined by the characteristics of pick-up 14 between the end of pick-up 14 and the top surface of the vibration generator or pick-up being calibrated. The location of the zero set point for a particular pick-up is determined in operation by means of an index mark on the displacement meter scale.

Connected to the output of pick-up 14 as by a lead 212, is the mechanical chopper or vibrator 211. The chopper includes an energizable winding 213, two sets of stationary contacts 216 and 217, and a vibrating contact arm 218 which is normally biased into engagement with contact 216. One terminal of winding 213 is grounded while the other terminal thereof is connected through a current limiting resistor 219 to the movable arm or contactor 221 of contact bank 209. When filter switch 204 is in "calibrate" position, arm 221 engages the first or left terminal of contact bank 209 which in turn is connected to an alternating current power source through lead 222. It will be apparent therefore that when filter switch 204 is placed in calibrate position, winding 213 will be energized by an alternating current source and that contact arm 218 will vibrate between contacts 216 and 217. The remaining terminals of contact bank 209 are each connected to a B+ potential source through line 225 for reasons which will soon become apparent.

Stationary contact 216 of chopper 211 is directly connected to lead 212, while stationary contact 217 of chopper 211 is connected to a variable tap of a calibrate-zero potentiometer 223. One terminal of potentiometer 223 is connected through a resistor 224 to ground while the other terminal of the potentiometer is connected through a resistor 226 to a source of regulated B+ potential.

The calibrate-zero potentiometer circuit or zero-balance circuit serves to apply a reference D. C. voltage to contact 217 of the chopper. By adjusting potentiometer 223, the potential of this D. C. voltage may be varied to be equal to the D. C. output voltage of pick-up 14 when the pick-up is positioned in its zero-set point. Consequently, when properly adjusted, as vibrating arm 218 engages contact 217, and the potential on this contact is adjusted to be equal to the output potential as applied from pick-up 14 to contact 216, the square wave voltage output from chopper 211 will be zero. Therefore, meter 176 will indicate a zero or minimum setting or amplitude. After this initial setting, pick-up 14 is moved toward the surface 24 of vibrator 12 a predetermined standardized amount. Desirably, this distance is set at exactly .02 inch by precise measuring apparatus such as, for example, a conventional micrometer. So that the prescribed distance may be accurately and repeatedly set through the apparatus alone, the output of pick-up 14 is also fed through line 231, a resistor 235, and calibrate contact or terminal of contact bank 206, to a sensitive displacement meter 232. The meter, which is of the ammeter type and responsive to the D. C. component of the pick-up output voltage, is provided with suitable markings on the meter face for visually indicating the zero set and operate points to enable the operator to set pick-up 14 the desired distance from the surface 24 whose amplitude of vibration is to be measured. In other than calibrate position, the meter is removed from the circuit and grounded to eliminate any spurious signals which may be generated by the meter when subjected to vibration. This grounding operation is performed by connecting the remaining terminals of contact bank 206 to ground. If desired, a resistor 233 and switch 234 may be placed in parallel with meter 232 to permit exciter tests for checking the instrument.

Contact bank 207 is used only when filter switch 204 is placed in "calibrate" position. Connected to the first or calibrate terminal of this bank and to ground is a parallel connected capacitor 237 and resistor 236. The function of capacitor 237 is to by-pass to ground the switching transients which occur during make and break of the vibrator contacts and therefore to facilitate the "bucking out" or adjustment of the calibrate-zero function.

Resistor 236 and capacitor 237 are inserted to shunt with attenuator resistor 238 in the calibrate position of filter switch 204. Resistor 236 in this circuit serves to increase the attenuation of the decade divider associated with the range switch, as hereinafter disclosed. This increased attenuation acts to compensate for low-frequency distortion of the calibrating waveform. Moreover, resistor 236 serves to compensate for any errors that may be caused by the impedance of the zero-balance voltage source. Since this source of impedance is in series with the decade attenuator resistance during only half the chopper cycle, the peak-to-peak amplitude of the chopper signal will necessarily be less or may be less than the difference between the probe voltage and the zero balance voltage.

The filter circuit of the present embodiment is shown as being connected in contact bank 208 of filter switch 204 and comprises a series of capacitors of decreasing size that are switched in series with capacitor 227 to restrict the low frequency response of the vibration measuring system at this point. In calibrate and normal position of filter switch 204, only capacitor 227 is inesrted in the network of the decade resistance divider, indicated by contact bank 202. In the 20 cycle, 200 cycle and 2000 cycle high-pass ranges, capacitors 228, 229, and 230, respectively, are connected in series with capacitor 227. These capacitors serve to restrict the low frequency response of the amplitude response of the vibration calibrator so as to provide a flat amplitude response only above the indicated frequencies.

The range of peak vibration amplitude which is measurable by the vibration calibrator is covered by four decade settings of range switch 200. These ranges are .01, .1, 1 and 10 mils full scale, respectively. It will be noted that in the .01 mil range, the preamplifier 80 is inserted in tandem with the main amplifier 82. This may be readily seen from the circuit as traced from line 212 leading from the pick-up 14, contact arm 218, capacitor 227, the filter switch, to the .01 terminal of contact bank 201, the assocaited switching arm, lead 86 which extends to the grid of electronic tube 85 of preamplifier 80, the output of electronic tube 97, contact bank 202, and lead 241 to the control grid of electronic tube 108 of main amplifier 82. By switching the preamplifier in the circuit on the .01 mil range, the preamplifier serves to provide a gain of 10. However, upon switching to the .1 mil range, the preamplifier is removed from the circuit, leaving only the main amplifier ahead of the output circuit. In order to obtain the remaining 2 decade ranges 1 and 10, a resistance divider comprising resistances 246, 247 and 238 are provided in the circuit of contact bank 202. As will hereinafter be described, switching of the filter and range switches 200 and 204 provides a control over the range and width of frequencies as well as the range of vibration amplitude to be measured.

*Operation*

Before vibration readings may be taken, the vibration calibrator is standardized with respect to the metallic surface of the vibration generator to be calibrated. In Figure 1, surface 24 comprises the vibrating portion of mechanical vibrator 12. It should be noted that for accurate measurements, the vibrating surface should comprise a non-magnetic metallic surface having a minimum diameter of ⅞ of an inch and a thickness of not less than .01 inch. Moreover, the metallic surface should have a resistivity not exceeding $8 \times 10^{-6}$ ohms per centimeter. The instrument is energized through a suitable power switch 300 positioned on housing 17 in Figure 1. After a warm-up period wherein the units of the vibration calibrator are energized for a period of time, range switch 200 is switched to its 10 mil position, and filter switch 204 placed in its calibrate position. The pick-up spacing is then adjusted relative to vibrating surface 24 to its zero-set point as determined by a designated mark on the displacement meter. Calibrate zero potentiometer 223 is then adjusted until a minimum reading is obtained on voltmeter 176.

It will be noted that during this initial adjustment, winding 213 of chopper 211 is energized by an alternating current through line 222 and that contact arm 218 is vibrating between stationary contacts 216 and 217.

Also, surface 24 is stationary. Therefore a quiescent D.-C., a signal from pick-up 14, is fed through line 212 to arm 218, during one half of the chopper switching cycle. On the other half of the switching cycle, when contact arm 218 engages contact 217, the adjustable D.-C. voltage developed by the calibrate zero potentiometer from the regulated B+ power supply connected thereto, appears on contact 218. The incremental signal i. e. the square wave of voltage with a peak to peak amplitude equal to the difference between the D.-C. voltages impressed on contacts 216 and 217, developed on contact 218 passes through capacitor 227, calibrate terminal of contact bank 208, contact bank 201, preamplifier 80, main amplifier 82, and voltmeter circuit 32. It will be apparent, therefore, that by adjusting the calibrate-zero potentiometer 223, the regulated potential applied to the circuit may be made to provide a null or zero point reading on meter 176 to correspond to the zero-set point of the pick-up. This zero set position is a certain fixed distance from surface 24, and is determined in operation by a marking on the displacement meter 232.

Upon adjustment of the zero-set point, pick-up 14 is moved an exact amount toward surface 24 such as, for instance, .02 inch, to provide an accurate standardizing displacement. The resulting peak to peak voltage amplitude appearing on chopper contact 218 corresponds to the amplitude of a signal from the carrier detector 20 that would be produced by a vibratory motion of surface 24 having a peak to peak vibration amplitude equal to the measured standardizing displacement. The indication appearing on displacement meter 232 is then observed and preferably marked so that the marking on the meter may be used to accurately position any future probe adjustments to the set displacement. Standardization of the vibration calibrator is completed by adjusting the gain set control 188 of voltmeter circuit 32 to provide a full scale reading on meter 176. It will be obvious that after making the above adjustments, whenever the A. C. component of the modulated signal developed across pick-up 14 reaches an amplitude of .02 inch or any other amplitude within its range, meter 176 will provide a direct reading of this amplitude.

After these adjustments have been made, the vibration calibrator is standardized and is prepared for calibration of vibration generator 12 by adjusting the spacing between the surface of vibration generator surface 24 and the pickup 14 so that the displacement meter reads at a predetermined operate point. This insures that vibration measurements will be made over a relatively flat portion of the sensitivity characteristic of pickup 14. In making a calibration of generator 12, filter switch 204 is placed in "normal" position. It is noted that in instances where the measurements of generator 12 are to be taken over a restricted bandwidth, filter switch 204 is placed in one of its other positions which are designated by specific frequency values. These frequency designations indicate the frequencies below which the response of the instrument to vibrations is suppressed. Also, range switch 200 is set in a selected position such as .1 mil; the position selected depending upon the anticipated amplitude of vibration to be measured. In any event, the peak amplitude of vibration as indicated by meter 176 is obtained by multiplying the vibration meter reading by the setting of range switch 200.

With the above typical settings, the specific operation in measuring and calibrating the vibrations of surface 24 is as follows: Upon energization, carrier oscillator 26 operates to generate a circulating current in its tank circuit at a frequency determined by the constants of the tank circuit. Should the product of the current and frequency vary in the tank circuit, an error signal is developed in the regulation circuit 29, amplified, and applied to the carrier oscillator circuit as a correcting signal.

The pick-up winding 21, which comprises a part of the tank circuit, is energized by the circulating current and induces a voltage in winding 22 which is modulated by the vibrations of surface 24. This voltage is detected by detector 73 and fed to arm 218 of electro-mechanical chopper 211 through line 212. It is noted that filter switch 204 is in normal position and as such, winding 213 is energized by the D. C. potential source and arm 218 is in stationary engagement with contact 216. The signal therefore passes through blocking capacitor 227, "normal" terminal of contact bank 208, to the .1 mil terminal of contact bank 202. From there, the signal passes through line 241 to the first stage of main amplifier 82 where the signal is amplified and fed through a cathode follower stage including tube 133. The output of this tube is taken across the cathode load resistor 139, 141 and fed to the voltmeter circuit 32 wherein tubes 173 and 174 detect the peak to peak amplitude signal. The peak amplitude of a sinusoidal vibration is then indicated by meter 176, since, the meter scale is so calibrated. Also, since the vibration calibrator has been standardized by means of a static displacement of .02 inch, and meter 176 has been adjusted to provide a full scale reading peak amplitude reading for this standardizing displacement through the medium of gain control 188, the peak amplitude of the sinusoidal signal as indicated by meter 176 will be the amplitude of the vibrating surface.

It will be noted that in the instances where range switch 200 is set to its .01 mil range, the signal is fed from filter switch 204 through contact bank 201, through line 86 to the first amplifier tube 85 of preamplifier 80. This signal is then amplified in the preamplifier and fed through line 225 to contact bank 202, line 241, and then to the main amplifier. As the signal is passed through preamplifier 80, a gain of 10 is obtained.

Figure 4:
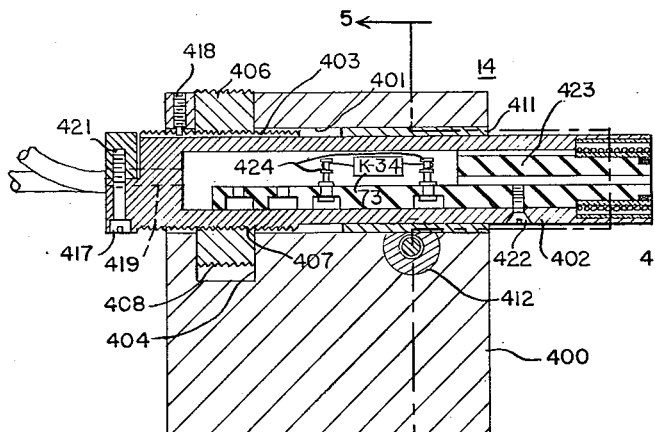
Figure 4 is a cross-sectional view taken on the lines 4—4 of Figure 1 and showing the constructional details of the mutual-inductance transducer or pick-up head.
Figure 5:
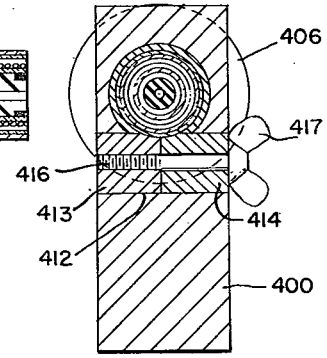
Figure 5 is a side elevation of the pick-up head shown in Figure 4.
Figure 6:
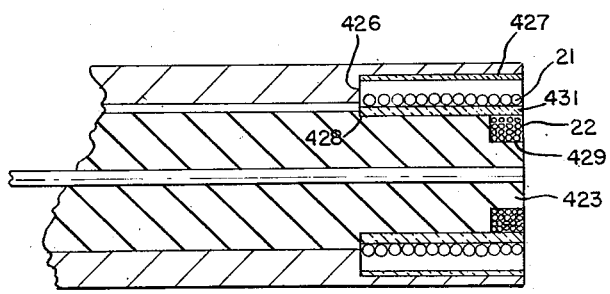
Figure 6 is an enlarged cross sectional view showing the details of the inductive pick-up head of Figure 4.

As best shown in Figures 4, 5 and 6, the preferred structural embodiment of the transducer or pick-up 14 includes a yoke or housing member 400 which is adapted to be suitably mounted in operative relation to the vibrating surface 24. The yoke member, which may be rectangular in construction, is provided with an elongated horizontal bore 401 in its upper portion (as viewed in Figure 4) for adjustably receiving therein an elongated cylindrical pick-up barrel 402. Desirably, barrel 402 is formed with an enlarged threaded portion 403 along its left outer surface to permit the lateral movement thereof in the yoke member 400. Fitted within a downwardly extended slot 404 formed transversely to the bore 401 in yoke member 400 is an annular adjustment nut 406. The adjustment nut 406 is provided with a threaded bore 407 therethrough which is adapted to be threadably received by the threaded portion 403 of barrel 402. Because of the narrowly spaced, parallel surfaces or sides of slot 404, the nut is restrained from lateral movement so that rotation of nut 406 serves to impart a lateral movement to pick-up barrel 402. For convenience of hand adjustment, the outer periphery of adjustment nut 406 is preferably knurled as at 408.

The right end reduced portion of barrel 402 is supported within bore 401 by a suitable sleeve 411 fitted within the bore. Formed through yoke member 400, transversely to bore 401 and intersecting the lower edge of sleeve 411 is a bore 412. The bore serves to carry a cylindrical locking nut 413 and a cylindrical locking bushing 414; each of which members is provided with a bore therethrough for receiving a locking bolt 416. Bolt 416, which has a wing nut 417 on one end for hand adjustment purposes, extends through the bore in locking bushing 414 and threadedly engages the locking nut 413. It will be apparent from this construction that the barrel may be readily adjusted in a lateral direction (as viewed in Fig. 4) by rotation of adjustment nut 406 and that by tightening wing nut 417, of bolt 416, the locking bushing 414 may be clamped against barrel 402, through intersected sleeve 411, to retain the barrel in adjusted position within the yoke. If desired, a lock-screw 418 may be used to engage the threaded portion 403 of barrel 402 to lock the barrel in position.

The pick-up barrel 402 supports and shields the electrical components of the transducer and generally comprises an elongated tubular member having its left end closed except for a passageway 419 formed therein for the entrance of electrical wiring. Desirably, a wire-clamp 421 is provided on the extreme left end to secure the wire connections in the pick-up against possible damage by pulling or other physical force. Carried within the barrel and secured thereto by a threaded bolt 422 is a Bakelite insert 423 having its right end portion suitably formed to conform with the internal circular configuration of barrel 402. The left portion of insert 423 is cut away and provided with a pair of terminal lugs 424 which serve to support the diode detector 73 (Fig. 3b).

Fitted within a cut-away portion 426 on the extreme right end of barrel 402 is a copper sleeve lining 427. The sleeve lining acts to reduce or minimize eddy-current and hysteresis losses in the barrel. The extreme outer end of insert 423 is provided with a first reduced portion 429 for snugly receiving the secondary windings 22 of the pick-up 14. Also, a second extended cut-away portion 428 is provided on the right portion of the insert 423 for receiving an insulating tubing 431 such as Pyrex or the like. The tubing serves as a coil-form for primary winding 21 and to insulate the primary winding 21 from the secondary winding 22.

It will be noted that the characteristics of the pick-up are determined by the particular characteristics of the winding. For instance, the range of linear operation of the transducer is a function of the winding configuration, that is, whether they are coaxial, circular and coplanar, and, further, the ratio of the diameter of the secondary winding to the diameter of the primary winding. For a given turns ratio, the range of linear operation is increased as the ratio of winding diameters is decreased but with a resultant decrease in transducer sensitivity. Therefore, the choice of transducer dimensions is determined by the minimum sample size and the range of vibration amplitude which is to be measured.

Obviously many modifications and variations of the present invention are possible in the light of the above teachings. It is therefore to be understood that within the range of the appended claims the invention may be practiced otherwise than as specifically described.

What is claimed is:

1. In an apparatus for measuring the vibration characteristics of a vibration means comprising, in combination, a mutual-inductance pick-up means adjustably positioned adjacent said vibration means and operative to produce an output signal proportional to the amplitude of vibration of said vibration means, regulated energizing means for said pick-up means, switching means, amplifier means, and indicator means serially connected to said pick-up means for amplifying and indicating the quantity of said output signal, and means for standardizing said indicating means in accordance with said vibration means, said standardizing means comprising a chopper means and a reference voltage source, said chopper means having two stationary contacts and a movable arm electromagnetically operable to alternately connect said contacts to said indicator, one of said contacts being connected to said pick-up means and the other to said reference voltage source, said chopper being operative to provide in its output, signal portions of said output signal and a reference voltage from said voltage source, and means for adjusting the initial indication of said indicator means in accordance with said signal portions.

2. In an apparatus as defined in claim 1 but further including a displacement indicator means connected to said pick-up means for producing an indication of the physical displacement between said vibration means and pick-up means, and a signal attentuation means connected between one of said chopper contacts and said indicator.

3. An apparatus for calibrating the vibration characteristics of a vibrating body by comparison with a standard displacement, comprising in combination a mutual inductance pick up means having a substantially flat sensitivity characteristic over a predetermined range of vibration amplitudes for producing a signal output proportional to the vibration amplitude of said body, means for energizing said pick up means, means for adjustably positioning said pick up means adjacent said vibrating body, an indicator, means for standardizing said apparatus over said predetermined range on said indicator when said vibrating body is in a quiescent condition, amplitude and frequency range selective means serially connected to said pick up, and A.-C. amplifying means connecting said selective means to said calibrated indicator.

4. An apparatus as recited in claim 3 wherein said means for standardizing said indicator comprises a source of reference voltage, chopper means disposed between said pick up means and said indicator for alternately connecting the output of said pick up means and said reference voltage to said indicator, means for adjusting said reference voltage whereby said indicator reading is zero when said pick up means is at a predetermined distance from said quiescent vibrating body and means for adjusting said indicator whereby a full scale reading is obtained when said pick up means is moved an exact distance from said predetermined distance.

5. An apparatus for accurately measuring vibration amplitudes of a transducer over a wide range of amplitude and frequency comprising a mutual inductance pick-up means positioned a distance from said transducer determined by the characteristics of said pick up and the range of amplitudes to be measured, regulated means for energizing said pick up means, means for directly comparing the output voltage of said pick up means with a voltage obtained from a predetermined static displacement, said means comprising serially connected switching means, range and frequency selective means, gain stabilized A.-C. amplifier means, and an indicator, said switching means cooperating with a source of reference voltage to convert the D.-C. output of said pickup means due to said static displacement into an A.-C. voltage whereby said indicator is standardized in accordance with said static displacement.

References Cited in the file of this patent

UNITED STATES PATENTS

| 1,842,190 | Ochse | Jan. 19, 1932 |
| 2,234,056 | Moore | Mar. 4, 1941 |
| 2,438,506 | Ladrach | Mar. 30, 1948 |
| 2,629,004 | Greenough | Feb. 17, 1953 |
| 2,648,979 | Cornett | Aug. 18, 1953 |
| 2,661,622 | Severs | Dec. 8, 1953 |

FOREIGN PATENTS

| 201,985 | Great Britain | Aug. 1, 1923 |